March 5, 1963 C. M. WENRICH ET AL 3,080,454

INTRA-PLANT VOICE COMMUNICATION SYSTEM

Filed July 6, 1959 4 Sheets-Sheet 1

INVENTORS
Carl M. Wenrich &
Joseph J. Radomski
BY
William J. Ruano
ATTORNEY

March 5, 1963 C. M. WENRICH ET AL 3,080,454

INTRA-PLANT VOICE COMMUNICATION SYSTEM

Filed July 6, 1959 4 Sheets-Sheet 2

INVENTORS
Carl M. Wenrich &
Joseph J. Radomski
BY William J. Ruano
ATTORNEY

INVENTORS
Carl M. Wenrich &
Joseph J. Radomski
BY William J. Ruano
ATTORNEY

March 5, 1963 C. M. WENRICH ET AL 3,080,454

INTRA-PLANT VOICE COMMUNICATION SYSTEM

Filed July 6, 1959 4 Sheets-Sheet 4

INVENTORS,
Carl M. Wenrich &
Joseph J. Radomski.
BY
William J. Ruano
ATTORNEY.

3,080,454
Patented Mar. 5, 1963

3,080,454

INTRA-PLANT VOICE COMMUNICATION SYSTEM

Carl M. Wenrich, Temple, and Joseph J. Radomski, Shillington, Pa., assignors to Gai-Tronics Corporation, Reading, Pa.

Filed July 6, 1959, Ser. No. 825,086
19 Claims. (Cl. 179—28)

This invention relates generally to a communication system and, more particularly, to a transistorized intra-plant, voice communication system embodying essentially two basic units, a speaker amplifier and a handset pre-amplifier station, the latter housed in a cabinet containing selector switches, a hook switch and a handset as a complete assembly. When two or more stations are wired together with two pairs of twisted wire, a complete two-channel system is provided, which enables paging over loudspeakers through a telephone-loudspeaker channel to reach the desired party, and then switching over to a party-line channel to finish conversation if it is desirable to converse without having the conversation heard over the loudspeakers. When the party-line channel is in use, the page channel is available for another page or conversation. Both channels can be used simultaneously for two different conversations.

Conventional intra-plant voice communication systems generally include rack mounted amplifiers to provide for a compact arrangement when large blocks of audio power are required. These amplifiers have vacuum tubes as rectifier and amplifier elements, with high voltages on the anodes.

Heat is produced in large quantities and usually must be removed by fans or other means. The overall power efficiency is low because of the filament power required and because the tube amplifier is usually designed to operate in class A, or AB. Class B tube amplifiers are difficult to design and relatively expensive to produce.

Tubes are inherently a source of trouble, as they gradually deteriorate. They operate at high temperatures, with high voltages applied, and are subject to shock vibration, etc., so are prone to catastrophic failure.

Conventional intra-plant voice communication systems require that shielded wire be installed between the amplifiers and the respective handsets or microphones. These extremely low level lines are subject to hum and noise pick-up, and, when switching means, such as hook switches or selector switches, are employed, require that special precautions be taken to insure dependable operation.

The shielded wire is expensive, and difficult to install, requiring a high degree of technical skill in its preparation at the terminations and splices, and is subject to mechanical damage. The cable must be installed in areas where the stray magnetic fields are low, so further restrictions, at most times unpredictable, are introduced.

Conventional intra-plant voice communication systems require that a source for earpiece level be brought to the handset. This requires either extra wires to the amplifiers, or taps from loudspeakers in some nearby area. In either case, extra wiring must be installed.

In conventional systems, if one amplifier unit becomes defective, a group of speakers or a major part of the system becomes inoperative. In the case of a preamplifier failure, the entire system will also fail. To prevent this, spare units and transfer facilities must be installed which involve considerable extra expense for installation.

In the present system, if an amplifier becomes defective, only that particular station becomes defective and the remainder of the system operates as before.

An object of the present invention is to provide an intra-plant voice communication system which is devoid of the above named disadvantages, wherein there are no filaments to heat, wherein high gain is available with small power expenditure, wherein low impedance circuits are used so as to minimize hum and noise pick-up, wherein the power circuits are more efficient because of the convenience of applying transistors in the class B code of operation, where power is consumed in direct proportion to signal output, and wherein substantially less heat is produced, not only because there are no filaments to heat, but also because of higher efficiency in the load circuits and lower voltages required by transistors.

A more specific object of the invention is to provide a novel, compact, self contained intra-plant communication circuit, including a small amplifier box located with the speaker, or immediately adjacent to a number of speakers which it supplies, and which can be mounted on a wall or building column, and wherein the only wiring necessary between the handset station and various speaker locations with their amplifiers is the regular telephone type twisted pair of conductors, instead of the commonly used shielded conductors. Thus in one position of the switch in the handset unit, all the speaker units will be operated through their amplifiers to effect over-all paging over the telephone-loudspeaker channel. After the party paged is reached, then by switching, a private conversation may be conducted over another twisted pair of wires between the two handsets only over a party-line telephone channel, thus being clear of the loudspeakers and releasing the paging channel for use by others.

A further object of the invention is to provide a high efficiency communication unit having components of small size making the unit very compact as well as inexpensive to manufacture and to maintain in operating condition.

A further object of this invention is to provide a medium level page line and party line of very low impedance, making possible the use of unshielded twisted pairs of wires for interconnecting the various units, without danger of hum and noise pick-up.

A still further object of the invention is to provide a communication system which makes it possible to locate an individual anywhere in the plant, by name, and to communicate with that individual, once located, without disturbing anyone else, and which provides more than one communication channel at any one time so designed that high ambient noise level will have no effect on the communication efficiency.

Another object is to provide an intra-plant communication system which is simple and inexpensive in cost, installation and in maintenance, having provisions for rapid clearing of any malfunction, also which is high in overall efficiency and which is flexible so as to be easily expanded or merged with another system.

Other objects and advantages of the invention will become apparent from a study of the following description taken with the accompanying drawings wherein.

Figures 5, 5A:
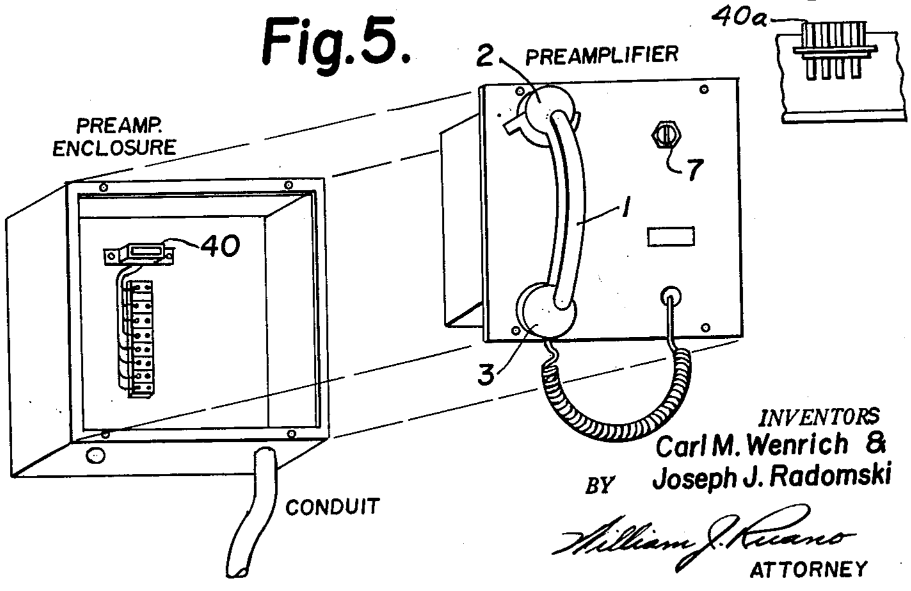
FIG. 5 is a perspective, exploded view of the preamplifier housing showing the cover portion separated from the remainder of the housing.
Figure 6:
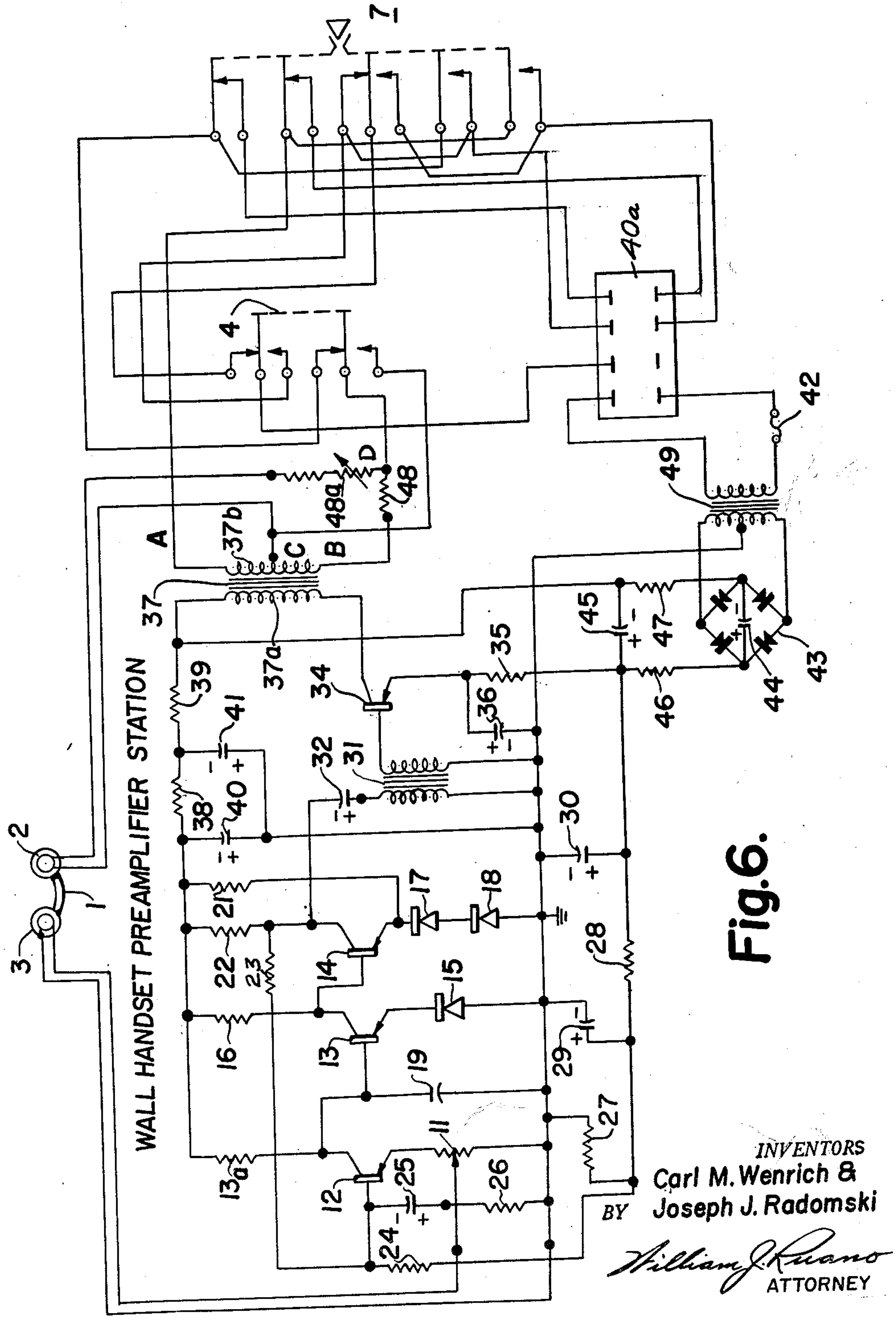
Figure 7:
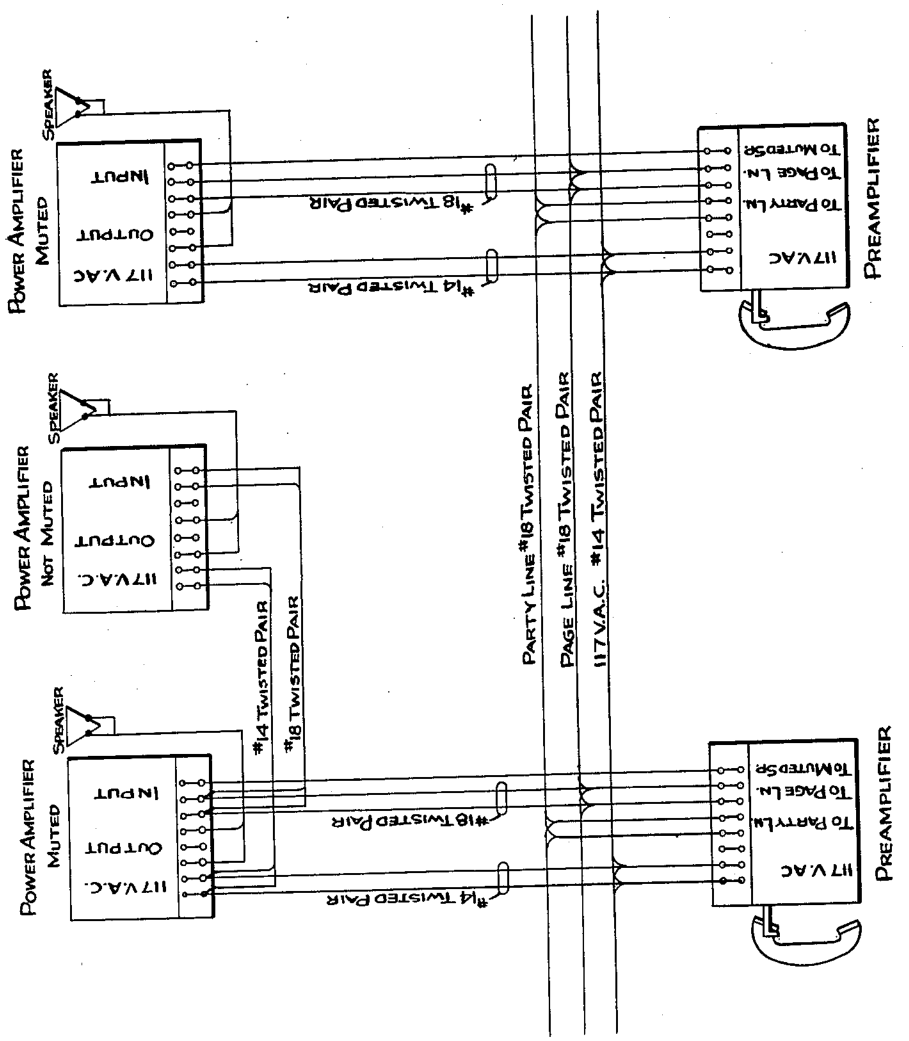

FIG. 5*a* is a fragmentary top view of the cover;

FIG. 6 is an electrical circuit diagram of the wall handset preamplifier station; and FIG. 7 is a schematic diagram of the entire intra-plant communication system.

The system embodying the present invention is designed around two basic units, a speaker amplifier, and a handset preamplifier station.

The speaker amplifier has a high impedance input (about 10,000 ohms) which is balanced to ground to minimize hum and noise pick-up. It has an 8 ohm and 16 ohm winding on the output transformer and self-contained A.C. power supply to convert 117 v. A.C. to 28 v. D.C., isolated from the power source by a transformer. The amplifier has a class A common emitter driver, which provides amplified signal for the output stage. The power output stage is a class B push-pull amplifier capable of delivering 12 watts of audio to a speaker. Class B amplification for audio frequencies is the most efficient possible. The amplifier is temperature compensated and will perform in ambient temperatures from minus 40 degrees centigrade to plus seventy-five degrees centigrade. The amplifier is so constructed that it can be quickly and easily replaced. This is accomplished by the mechanical plug-in construction shown in FIGS. 2 and 5 for the speaker amplifier and the handset preamplifier, respectively. This plug-in feature contributes to ease of installation and maintenance, and to rapid return of the system to normal operation in the event of a failure as will be described more fully hereinafter.

The most difficult phase in the design of transistor amplifiers is the compensation required to permit proper operation throughout large temperature variations. One of the important requirements, especially in power amplifiers, is the provision for maximum transfer of heat from the transistor junction to a heat sink, which in the present system is the chassis. The present circuit permits fasten- of the transistor directly to the chassis to obtain maximum heat transfer.

The exceptionally good performance of the equipment embodying the present invention in high ambient noise is due primarily to special features to be found in the circuitry. These features are disclosed and described as follows:

To communicate from a noisy area, the signal level should be much higher than the accompanying noise. In order to achieve this objective, we have provided a microphone and handset combination which places the microphone very close to the user's lips and have provided a pressure differential microphone which shows a high discrimination against noise originating a few feet from the microphone.

In addition, by reducing side tone by means of a hybrid circuit, we have utilized a natural tendency to speak up into the microphone if the receiver is low in level.

To hear in a noisy area, the signal from the line to the earpiece should not be masked by side tone or signal in the earpiece which originates in the local microphone. This has been accomplished by balancing out the extraneous signals originating from the local microphone and preamplifier so that virtually all of the annoying or interfering side tone is eliminated. The explanation of the hybrid created to affect these highly desirable end results is found in the preamplifier description.

Loudspeaker communication systems should be flexible enough to allow for adjusting each speaker for the exact level required for the noise situation in its immediate area, without introducing extra losses, and should be stable so that the adjustments, once made, will remain optimum. In the conventional systems known to the present day art, amplifier circuits are designed for relatively high wattage which, properly utilized, would supply many speakers located in a variety of areas. To adjust the level of operations of these speakers, matching devices with taps, etc., are required at each speaker. These devices inherently are not precise in level adjustment and introduce undesirable losses.

The above mentioned objectives of the present invention have been accomplished in the following manner. Each speaker has its own power amplifier, which is located right at the speaker. It is readily possible, therefore, to adjust the level in a precise manner and no more power than is required by the speaker is taken from the amplifier by reason of this adjustment. This contrasts with the previously accepted methods involving the use of T pads, matching devices, etc., with their inherent losses. There are no high-power audio distribution lines of relatively long length with their attendant losses, and no line matching transformers with their additional inherent losses. All the power developed in the amplifier is therefore used in the speaker. Since there are no vacuum tubes, with their characteristic gradual deterioration, the gain of the power amplifier remains stable over long periods of time. In order to assure stable operation over wide temperature variations, the power amplifier is compensated by use of a thermistor in the base circuit, and a stabistor in the emitter circuit of the class B out-put stage to provide a bias step. With the bias step in the emitter, higher temperature operation is permissible without danger of self destruction or loss of stability.

The output of the preamplifier is stable for the same reasons. There are no vacuum tubes to deteriorate, so periodic readjustment is not necessary. The preamplifier is temperature and gain compensated by a feedback loop and stabistor combination in the direct coupled section (see description of preamplifier) and by the constant current supply in the output stage of the preamplifier.

These features give constant system gain and frequency response over a wide temperature range and particularly for continuous service over long periods of time.

The mechanical design features which contribute to the performance of the system are as important as the circuit features. For example, the circuit design which allows the power transistors to be securely fastened to the chassis without insulating wafers results in maximum output from the transistors without exceeding the power limitations.

The low impedance input of the preamplifier allows the use of unshielded handset cords which are more durable and a great deal more flexible. This low impedance greatly minimizes the hum and noise pick-up and results in greater increase of intelligibility. The output impedance of the preamplifier is approximately 30 ohms so the medium level page line and party line are at a low enough impedance so that two ordinary telephone type twisted pairs of wires are all that need be used to interconnect the complete system. In fact, the 117 v. A.C. supply lines, if twisted, can be run in the same conduit with the medium level lines with no danger of hum and noise pick-up.

Because of the inherent design features of the present equipment, no expensive shielded cable is required. A single conduit may be used to contain all the wiring, and in addition to the lower cost of installation, fewer wiring errors can be expected because of the simplicity.

The units individually are compact, sealed against dust, etc., and are separate, plug-in units. A failure in one amplifier will not affect the rest of the system. The plug-in feature allows unskilled labor to remove any defective unit and replace it with a spare unit in a minimum of time.

Installation is simplified also because the enclosures contain terminal facilities and a receptacle with ample space for field wiring and conduit termination. The system can be installed piecemeal or all at once at the discretion of the user. Two handset stations and two speaker amplifiers are a complete system and could be used as such. It is, therefore, evident that should a system, once installed, need expansion, all that need be done is wire-in additional preamplifiers or speaker amplifiers. By reason of its design features, it is very convenient and inexpensive.

Figure 4:
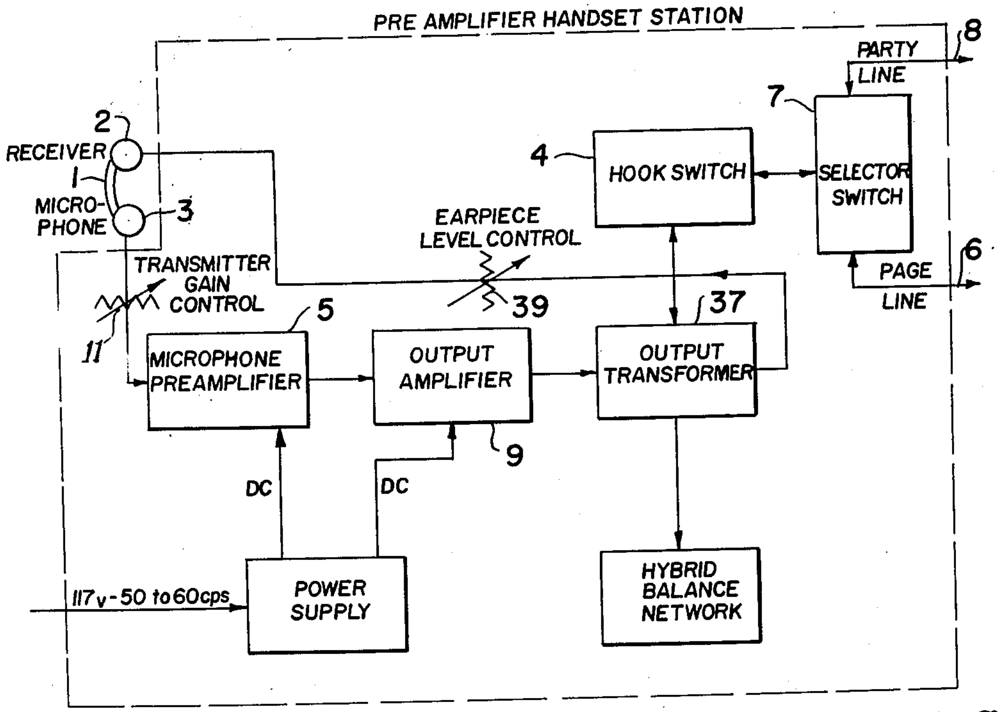
FIG. 4 is a block diagram of the preamplifier handset station.

The preamplifier handset station shown in FIG. 4 includes a telephone type handset 1 with a high efficiency earphone or receiver 2 and a pressure differential, low impedance dynamic microphone 3, a hook switch 4 which disconnects the output transformer 37 from the signal lines when the preamplifier is not in use, a selector switch 7 which allows the user to page via the loudspeakers or to select the party line 8 and talk handset station to handset station, and a high gain temperature compensated transistor amplifier 9, all in a compact plug-in unit. The complete circuit diagram of the preamplifier is shown in FIG. 6.

The operation of the preamplifier can best be described by separating it into its circuit functions, as illustrated in the preamplifier block diagram shown in FIG. 4. The receiver 2 and microphone 3 are both mounted on the handset. The microphone 3 is a noise canceling, close talking, pressure differential low impedance dynamic unit, which offers the following advantages. The close talking, pressure differential characteristics greatly reduce the transmission of ambient acoustic noise. The low impedance (about 10 ohms) reduces the pick-up of local electrical noise, also allows the use of unshielded wire in the handset cord, which in turn, reduces drastically the maintenance required, since shielded cord is much more susceptible to deterioration and mechanical damage.

The microphone signal appears across a gain control 11 which adjusts the amount of microphone amplification available. From the gain control 11, the microphone signal enters a three stage direct-coupled transistor preamplifier, which is temperature compensated and gain compensated to the extent that very nearly any quality transistor of a fairly comparable type may be inserted into the circuit in place of the units presently used 12, 13 or 14 with little or no change in preamplifier characteristics, and temperature variations from minus 30 degrees centigrade to plus 70 degrees centigrade have little effect on preamplifier characteristics.

The operation of the preamplifier is as follows (see FIG. 6):

When a microphone signal appears across gain control 11 it is fed to the emitter of input transistor 12. Variations of the transistor collector current cause a variation of the amplified voltage appearing across the collector load resistor 13*a*. The base input of transistor 13 is direct coupled to resistor 13*a*, shunted to ground by capacitor 19 to prevent high frequency oscillation. Amplified voltage variations across collector load resistor 13*a* appear on the input of transistor 13. The voltage variation on the input of transistor 13 produce collector current variations in the transistor. The collector current variations in the collector load resistor 16 of transistor 13 produce amplified voltage variations across resistor 16. The collector of transistor 13 is directly connected to the base of transistor 14, which is operating in grounded emitter connection, thus the amplified voltage variations appearing across resistor 16 appear on the input of transistor 14. The voltage variations on the input of transistor 14 produce collector current variations in transistor 14. The collector current variations in the collector load resistor 22 of transistor 14 produce amplified voltage variations across the resistor 22. The collector of transistor 14 is connected to the primary winding of transformer 31, through coupling capacitor 32, which isolates the D.C. on the collector of transistor 14 from the low D.C. resistance of the transformer winding. The transformer 31 isr equired in order that an efficient impedance match be made between the relatively high collector impedance of transistor 14 and the low base impedance of transistor 34.

The semi-conductor (stabistor) 15 in the emitter circuit of transistor 13 is biased in the forward direction by the collector current of transistor 13. It is a characteristic of semi-conductor diodes that the forward voltage drop is very nearly constant for wide variations in current. The insertion of diode 15 in the emitter circuit of transistor 13 raises the operating point of the base above ground by a voltage equal to the drop across diode 15. The proper selection of collector load resistor 13*a* and operating point for transistor 12 permits one to adjust the collector voltage of transistor 12, so that it is precisely equal to the voltage required on the base of transistor 13. This allows direct coupling, stage to stage, with the same ground and collector supply. The low dynamic impedance of diode 15, as used in this circuit, eliminates the need for by-passing to maintain high stage gain.

Diode 15 has much lower dynamic impedance than would an equivalent resistor net, therefore causing less degeneration, and allowing realization of more gain from the stage. In addition to this advantage, the voltage drop across diode 15 is relatively independent of the current through it, thereby stabilizing the stage for temperature variations, because the transistor current is a function of the junction temperature.

The circuit is extremely tolerant to transistor variations and eliminates any necessity for transistor selection. In addition, the circuit allows the use of commercial tolerance on all components.

Diodes 17 and 18 in the emitter circuit of transistor 14 are biased by both the collector current of transistor 14 and additional diode current through resistor 21. The additional bias current is required to reduce the impedance of the diodes and to make the voltage drop across the diodes more constant than would otherwise be possible. The diodes 17 and 18 in the emitter circuit of transistor 14 raise the operating point of the base of transistor 14 high enough so that the base can be connected directly to the collector of transistor 13 if the value of collector resistor 16 is properly chosen. The impedance of the diodes 17 and 18 is low enough so that by-passing the diodes is not required to maintain stage gain. Resistor 21, in addition to the collector current of transistor 14, is used to draw sufficient current through diodes 17 and 18 to assure the stability of this transistor's operating point. The collector resistor 22 is the preamplifier output load, and the cumulative current variations appear across resistor 22. The collector of transistor 14 is connected to the base of transistor 12 by resistor 23. The base of transistor 12 is connected through resistor 24 to a stable positive voltage source, in this case, the junction of resistor 27, capacitor 29 and resistor 28. Resistors 23 and 24 in combination with the positive D.C. supply provide the proper operating point for the base of transistor 12. Any variations of collector current in transistor 14 are fed back to the base of transistor 12 and the phase relationship between transistors 12 and 14 is such that the variation on the base of transistor 12, caused by the variation of collector current in transistor 14, will restore, through the direct coupled amplifier stages, the original collector current condition. In this manner, collector current variations in any or all stages of the amplifier, whether caused by differences in transistors, variations in temperature or variations in supply voltages, will be corrected automatically. The feedback just described is D.C. feedback, but along with D.C. variations, signal is also fed back. There is enough A.C. feedback to cause the circuit to oscillate so the A.C. component is controlled by the series network formed by capacitor 25 and resistor 26. Capacitor 25 itself without resistor 26 would completely by-pass the A.C. feedback and resistor 26 without capacitor 25 would remove most of the D.C. feedback. The amount of A.C. feedback is controlled by proper selection of resistor 26.

Power transformer 49 has a primary winding and center tapped secondary winding. The center tap is connected to ground with the secondary ends connected to a full wave bridge rectifier. This provides a negative and positive potential with respect to ground. The negative voltage is supplied to the collectors and the positive voltage is supplied to the emitter of transistor 34 and provides positive bias for the direct coupled amplifier formed by transistors 12, 13 and 14. The positive supply is filtered by capacitors 44, 45, 30 and 29 with resistors 46 and 28; the negative supply is filtered by capacitors 44, 45, 40 and 41 with resistors 47, 38 and 39.

Voltage is fed back through resistor 23 to the base of input transistor 12, and the correct operating point is selected for this transistor by proper choice of resistor 24. This sets the D.C. feedback loop formed by resistors 22, 23 and 24. There is, however, enough signal feedback to cause the circuit to oscillate, so part of the A.C. feedback is shunted to ground through capacitor 25. The amount of signal feedback which is used is determined by the value of the resistor 26 in series with the capacitor 25 and ground.

Resistors 27 and 28 comprise a voltage divider which provides positive bias to set the preamplifier operating point. Capacitors 29 and 30 are filtering capacitors, required because any hum and noise existing on this bias voltage would be greatly amplified by transistors 12, 13 and 14.

Resistor 35 is in series with transistor 34 and primary 37*a*. The entire power supply voltage across capacitor 45 appears also across this series network. The relatively high resistance of resistor 35 causes resistivity change due to temperature of transistor 34 to have negligible effect on current through the series network composed of primary 37*a*, transistor 34 and resistor 35. The secondary of transformer 31 is connected to the base of transistor 34 and to the chassis ground. Chassis ground is at the voltage midpoint of a split power supply composed of a center tap winding of the secondary of transformer 49, the bridge rectifier formed of diodes 43, resistors 46 and 47 and capacitors 44 and 45. The center tap supply gives a negative voltage and positive voltage of equal value referred to chassis ground. The negative voltage serves as collector supply of transistor 34 and the positive voltage through resistor 35 is the constant current emitter supply for transistor 34. This constant current feature has two advantages: (1) the transistor parameter variations due to variations in temperature are minimized and (2) variations in characteristics of transistors have little effect on the operation of the amplifier. In other words, there need be no selection of transistors or individual adjustment of the operating point in the manufacture of the amplifier.

Transistor 14 is coupled to transformer 31 by a capacitor 32. Transformer 31 is required because the output impedance of transistor 14 is much higher than the input impedance of transistor 34, which is the output transistor. Transistor 34 is stabilized by providing it with a constant current source by feeding the last stage through a relatively high resistor 35. This resistor would not allow us to realize any gain in the output stage, so it is by-passed for audio frequencies by capacitor 36. The collector load for transistor 34 is the primary winding 37*a*. Resistors 38 and 39, with capacitors 40 and 41, provide a two-section RC filter network which provides well filtered D.C. to the preamplifier stages.

The secondary 37*b* of transformer 37 is center tapped and is part of a hybrid network which provides very important advantages over the usual paging system. Since paging systems, particularly when applied in industrial plants or utility generating stations, are subjected to greater than normal noise level areas, it is highly desirable to eliminate side-tone in the transmitting handset. This is accomplished by a special circuit and its function is described as follows:

The current variation in the primary 37*a* causes a corresponding variation in the secondary 37*b*. Point A of the secondary is out of phase with point B, and point C is the midpoint of the winding. Points A and D are the output of the preamplifier.

Points B and D are connected by a resistor 48. When the line impedance is equal to that of resistor 48, then the potential at point C is equal to the potential at point D. The earphone is connected between points C and D, with a rheostat 48*a* in series serving as a volume control. It is evident that when the line impedance is equal to the balance impedance of resistor 48, there can be no current in the earpiece for the signal which originates in the preamplifier, because the potential between point C and point D is zero. Therefore, the noise and speech signals picked up by the microphone 3 do not appear across the receiver 2. This increases the ability to understand an incoming signal that is, the intelligibility of the signal in the earpiece 2 by eliminating local noise and signal produced in the microphone. The intelligibility of the output signal is improved by the effect of causing the person speaking in the microphone to speak louder because he does not hear his own voice in his own earpiece, that is, there is no side tone.

An incoming signal appears across the earpiece, with minimum loss, ideally zero, across the balancing resistor 48. All systems are line balanced when installed.

The output of the preamplifier is connected through the hookswitch 4 to the selector switch 7. The hookswitch 4 serves to disconnect the preamplifier from the medium level lines, and, when the preamplifier is not in use, to short points C and D together. This prevents any possibility of the preamplifier oscillating when it is not loaded by the line impedance.

The selector switch 7 selects either of two outgoing medium level lines. One of the lines, the page line, feeds the inputs of all speaker amplifiers in the system, so that in this switch position, speech on the preamplifier is sent out over the loadspeakers. Should extended conversation on the page channel be desired, the switch 7 can be locked into the page position by turning the pushbutton 90° clockwise. The other line is a party line, which interconnects all preamplifiers whose selector switches are in party position. Thus, two or more preamplifiers can communicate with each other without loudspeaker amplification. This system allows the page channel and party line channel to be used simultaneously or separately.

Terminals #4 and #8 on plug 40*a* on the rear of the preamplifier cover portion or chassis (see FIGS. 5 and 5*a*) which plug is adapted to be plugged in the plug receptacle 40 in the terminal box portion, connect 117 v. A.C. to the power transformer 49 through a fuse 42. The transformer supplies low voltage A.C. to a full wave bridge rectifier 43, where it is converted to full wave D.C. Capacitors 44 and 45, with resistors 46 and 47, filter the pulsating D.C. to provide the preamplifier with a low hum level. The center tap on the secondary of transformer 49 is grounded, which provides a positive and negative voltage with respect to ground. The negative supply is used to feed the collectors of all stages, and the positive supply feeds the constant current emitter of the output stage and provides the positive bias point voltage needed by the direct coupled stages.

When the handset is hung up, the output of the preamplifier is disconnected from the selector switch 7 by the hookswitch 4. At the same time the receiver is shorted to prevent acoustical coupling with the transmitter. In addition, a load is placed across half of the secondary of the output transformer to replace the load normally supplied by the connecting lines. Additional means are provided on the hookswitch 4 to silence an adjacent speaker when the handset is removed from the hookswitch with the selector switch in the page position. This prevents acoustical feedback between the speaker and transmitter.

When the handset is removed from the hookswitch 4, the output of the preamplifier is connected to the selector switch 7, the short is removed from the receiver and the load resistor is removed from the center tap of the output transformer and reconnected to form the balance resistor of the hybrid circuit.

The selector switch 7 is a two-position switch, whose function is to select a page or party line operation. When the handset is removed from the hookswitch and the selector switch is in page position, the output of the preamplifier is connected to a twisted pair of conductors, which connect to the input of a speaker amplifier or amplifiers for paging purposes. These same conductors also connect to all other handset stations to allow conversation between handset stations on the page channel. In addition, a means is provided on the selector switch to silence an adjacent speaker amplifier, if required. When the handset is removed from the hookswitch 4 and the selector switch 7 is in party line position, the output of the preamplifier is connected to a second pair of twisted conductors, which connect to all handset stations to provide communication without the use of the loudspeakers.

FIG. 5 shows, on the right, the cover portion of the preamplifier assembly, which cover portion houses the preamplifier circuit and a plug 40*a* which plugs into socket 40 of the terminal box shown on the left to complete the preamplifier circuit. A similar cover unit (not shown) with a similar plug for plugging into socket 80 is provided for the speaker amplifier terminal box shown in FIG. 2.

The advantages of the plug-in feature for the respective amplifiers is that the wiring installation may be completed with the exception of plugging in the cover portion of the amplifiers which contain the sensitive portions of the circuit which are more apt to be damaged. Installation can be made of all or any part of the system. The handset preamplifier and speaker amplifier are protected from dust and misuse during construction or installation. The cover portions of both are plugged in after installation is completed. In the event of failure of a unit, it can be quickly replaced in minutes with only a screw driver. The construction of the plug-in units promotes rapid heat dissipation, promoting long life and allowing operation at elevated temperatures. Moreover, unskilled personnel can keep the system in perfect condition because the units are merely plugged in.

Figure 3:
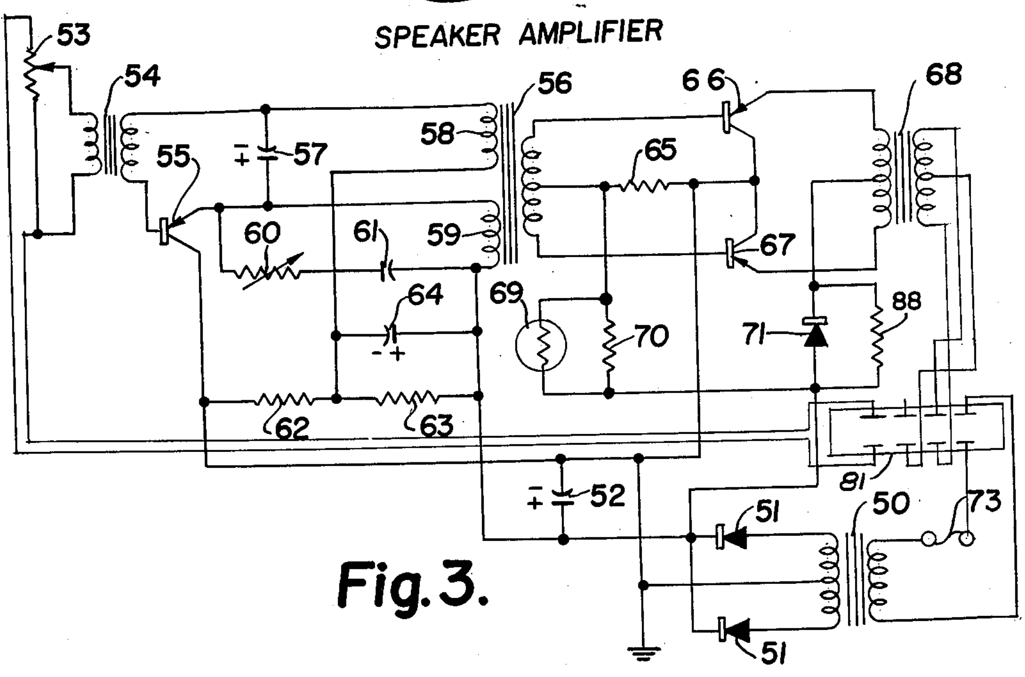
FIG. 3 is an electrical circuit diagram of the speaker amplifier.

The speaker amplifier shown in FIG. 3 is a class B transistor audio amplifier, capable of supplying 12 watts of audio to a speaker load. It has an overall gain of 50 db.

Figures 1, 2:
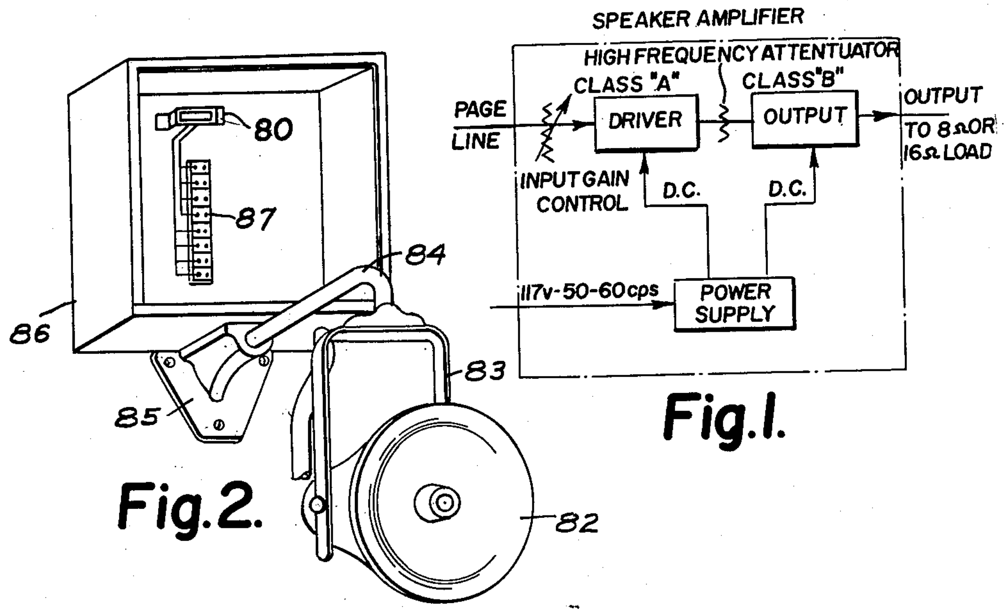
FIG. 1 is a block diagram of the speaker amplifier.
FIG. 2 is a perspective view of the speaker amplifier housing with the cover removed.

The amplifier can best be described by separating it into its three main circuit functions; class A driver, Class B output, and power supply as illustrated on the speaker amplifier block diagram in FIG. 1. All three functions are accomplished on a chassis which measures approximately 40 square inches. The chassis is preferably made of ⅛" aluminum and serves as a very efficient heat sink for the transistors and rectifier.

The power supply uses a transformer 50 to obtain low voltage A.C. from a 117 volt source. The low voltage A.C. is converted to D.C. by means of a full wave rectifier 51. The pulsating D.C. obtained from the rectifier is filtered by capacitor 52, and is applied to the driver and output stages.

Tracing the audio signal through the amplifier, starting with the driver stage, the input to the amplifier is on terminals 1 and 5 of the plug 81, thence, to a gain control 53 which serves to adjust the output level of the amplifier. A transformer 54 matches the high input impedance to a low base impedance of the driver transistor 55. Transformer 54 also serves to isolate the input terminals from amplifier ground or common connection so as to allow balanced input which is necessary if hum and noise pick-up are to be minimized.

Transistor 55 is operating in class A, common emitter, but, by use of the split primary winding of the driver transformer 56, one is able to mechanically ground the collector for maximum heat transfer, while from the standpoint of the input signal, the emitter is grounded for maximum gain.

By-pass capacitor 57 for audio signals connects the ground end of the secondary of transformer 54 to the emitter of transistor 55 and winding 58 of the primary of transformer 56 causes the ground end of transformer 54 to duplicate the voltage variations of the emitter, which in turn are the result of emitter current variation in primary winding 59 of transformer 56. Winding 59 is the transistor load winding. It is shunted by the series net composed of rheostat 60 and capacitor 61 which comprise a variable high frequency attenuator or tone control. This control is useful in high level paging under high noise level conditions, where acoustic feedback may become a problem.

Resistors 62 and 63 provide the proper operating point for transistor 55 for minimum distortion and maximum gain. Capacitor 64 has a similar function to capacitor 57 in clamping the ends of primary 58 and primary 59 together.

The output stage is driven by the center-tapped secondary of transformer 56 which is connected to the bases of the output transistors 66 and 67. The operating point is provided by a network composed of resistor 65 in series with thermistor 69 shunted by resistor 70. When a thermistor is heated, the resistance is reduced in value, so as the ambient temperature increases, the base potential approaches the emitter potential. This keeps the collector current constant. As the temperature falls, the resistance of the thermistor rises above the ideal value, so resistor 70 was selected to provide the proper operating point at the lowest temperature. Under extreme heat conditions, the bases should be even lower in potential than the emitters, so a voltage step is introduced between the emitters and the supply voltage by the use of a forward conducting diode 71. This step has extended the high temperature compensation far beyond any other type of compensation.

The transistors 66 and 67 are in the common collector configuration, so again they can be fastened securely to the chassis for maximum heat transfer. The output transformer 68 matches the output impedance of the transistors to the low impedance required by a loudspeaker. There is a choice of 8 ohms or 16 ohms on the secondary of transformer 68. The output terminals are conducted from the chassis through pins 2, 3 and 7 of plug 81. Pins 4 and 8 are used to supply 117 v. A.C. to the power transformer through a fuse 73.

The speaker amplifier has a plug 81 similar in construction to plug 40*a* (FIG. 5*a*) of the preamplifier, that is, mounted on the rear of the cover (which is like that shown in FIG. 5) for the terminal box 86 enclosing terminal strip 87. Thus if any fault develops in the speaker amplifier, the cover unit is unplugged from box 86 and replaced by a new cover unit.

The temperature compensation of the output class B amplifier of the speaker amplifier shown in FIG. 3 is accomplished as follows. The proper operating point for transistors 66 and 67 is obtained with the thermistor-resistor network composed of resistor 65 and thermistor 69 in parallel with resistor 70. At any specific temperature, thermistor 69 assumes a value of resistance which properly biases transistors 66 and 67. If the transistor junctions of said transistors are heated by a rise in ambient temperature, thermistor 69 will also be heated by said rise. When thermistor 69 is heated its resistance decreases. Therefore, if resistors 65 and 70 and thermistor 69 are properly proportioned, the voltage appearing at the junction of resistors 65 and 70 and thermistor 69 will vary in accordance with requirements of change in the required operating point so as to properly bias the bases of transistors 66 and 67. The limit of this compensation is reached when thermistor 69 approaches zero. Normal compensation schemes involve connection of the junction of thermistor 69 and resistor 70 to the emitter return shown in FIG. 3 by the center tap of transformer 68.

It will be found at some relatively high temperature, that the transistors can no longer be properly compensated because the base biasing point (bias voltage on bases) would have to be below the emitter voltage (more positive). This is difficult to accomplish economically, requiring a separate positive supply.

Diode 71 and resistor 88 are inserted between the positive supply, that is, the junction of diodes 51 and center tap of the primary of transformer 68. The diode 71 is conducting current in a forward direction, therefore has low but relatively stable forward voltage drop over a wide range of currents. Therefore, if the junction of thermistor 69 and resistor 70 is connected to the junction of diode 71, resistor 88 and diodes 51, then it will be possible for the thermistor to adjust the bias voltage below the emitter voltage, ideally to a value equal to the voltage drop across diode 71. This allows compensation of the output stage to a much higher temperature.

The driver stage of the speaker amplifier in FIG. 3 is stable over a wide variation of temperature for the following reasons. The bias point of the driver amplifier transistor 55 is provided by a resistor network comprising resistors 62 and 63. Resistor 63 is of low enough value so that the operating point is relatively stable for a large variation in collector current. But the transistor amplifier for maximum gain must be used in common emitter configuration. However, most transistors presently used have their collector junction connected to the case or body of the transistor. Maximum temperature stability requires that heat be removed from the collector junction as efficiently as possible. Therefore the collector should be firmly fastened to the chassis or heat sink.

In accordance with the present infention, by use of a split primary of transformer 56 and a floating secondary of transformer 54, it has been possible to mechanically ground the collector of transistor 55 while electrically, that is for signal, the emitter of transistor 55 is grounded. This allows attainment of high gain of the grounded emitter and temperature stability of the grounded collector. The output load of transistor 55 is winding 59 of transformer 56. Therefore, signal developed across winding 59 produces an identical signal on winding 58 of transformer 56. The lower end of winding 59 for audio frequencies is connected to the lower end of winding 58 by capacitor 64.

Therefore any variations which occur on the upper end of winding 59 appear on the upper end of winding 58. The upper ends of both windings are connected for audio frequencies by capacitor 57. The grounded end of the secondary of transformer 54 is connected to the junction of capacitor 57 and the upper end of winding 58. This connects the emitter of transistor 55 to the grounded end of the secondary of transformer 54. This is the requirement for grounded emitter operation.

The split primary of transformer 56 is required because the positive lead from the power supply, for audio frequencies, is grounded to the chassis by capacitor 52. Therefore, audio would be shorted by the power supply if signal ground for the driver were not allowed to vary with the fluctuations caused by the variations of collector current of transistor 55. Signal developed across the primary of transformer 54 is induced in the secondary and applied to the base of transistor 55. The amplified signal developed in winding of transformer 56 appears on the secondary thereof.

FIG. 2 shows how the speaker 82 is mounted on an inverted U bracket 83 for tilting movement in a vertical plane, which bracket is mounted on the end of rod 84 for rotatable movement with respect thereto in a horizontal plane. Rod 84 is fastened to a wall bracket 85 integrally secured to the terminal box portion 86 of the speaker amplifier housing, the cover portion being substantially identical to the cover portion of the preamplifier shown on the right of FIG. 5. The fittings between the respective cover portions, however, are such that the cover portion of the preamplifier can not be mistakenly fitted to the terminal box portion of the speaker amplifier, and vice-versa.

FIG. 7 shows the entire intra-plant communication system illustrating a pair of stations, although as many additional stations as needed may be added thereto in the same manner.

It will be readily observed that upon removing the handset from a preamplifier station a connection is made through the page line to the loud speaker of the remote station. After the paged party answers, private communication may be had over only the party line, exclusive of the loud speaker.

In addition, means are provided in the selector switch to reconnect a silenced speaker amplifier when the selector switch is in this position: (Party line). This allows an individual who is using the handset station in the party line position to be paged via the loudspeaker. The switching means described provide two separate and independent channels of communications, which will allow two conversations to take place simultaneously.

Thus it will be seen that we have provided an efficient communication system which is particularly adapted to intra-plant communication as well as communication in the field between military units, and for other communication systems; wherein plant-wide instructions, warning etc. or paging of personnel by name may be provided over a page line or channel over various loudspeakers at differently located receiving stations whereby conversation between two or more persons may be heard over the loudspeakers, and, in which the paged party, answering, by merely turning a pushbutton, may transfer the communication over to another line, for private communication, that is, a party line channel so as not to be heard over the loudspeakers, also wherein separate conversations may be carried on simultaneously over both channels by different pairs of parties; furthermore, we have provided a telephone instrument specially designed to transmit from and receive in extremely high ambient noise levels without acoustic protection (acoustic booths etc.), wherein each telephone instrument is provided with its own compact transistor amplifier which may be selectively connected to either the page or party line channel and wherein each loudspeaker is provided with its own compact transistor power amplifier, and wherein both said amplifiers are connected to the system by plug-in connections in self aligning receptacles contained in dust and weather proof enclosures along with terminal facilities for field wiring consisting of unshielded twisted pairs of wires thereby greatly facilitating installation and maintenance; furthermore we have provided transistor amplifiers designed to operate over a wide ambient temperature range; also, we have provided loudspeaker amplifiers connected directly with loudspeaker voice coils, eliminating line and matching transformer losses and including individual volume control permitting the loudspeakers to be set at exactly the correct volume; furthermore, we have provided a system which can be installed and operated with a minimum of two stations and which can be expanded as required by merely extending the system wiring by adding the desired number of communication units or stations and adjusting the line balance which is provided to maintain proper loading; furthermore, we have provided a communication system which is relatively inexpensive to manufacture and simple to operate and to maintain, which has relatively long life with practically no likelihood of faulty operation, and which provides a high degree of clarity, fidelity and intelligibility of voice conversations.

While we have illustrated and described a single specific embodiment of our invention, it will be understood that this is by way of illustration only, and that various changes and modifications may be made within the contemplation of our invention and within the scope of the following claims.

We claim:

1. An intra-plant voice communication system comprising a plurality of separate stations; each station including a loudspeaker and associated power amplifier and power supply therefor and including a handset having a receiver and a pressure differential low impedance microphone, a preamplifier handset station connected to said handset and including a microphone preamplifier connected to said microphone, an output amplifier therefor of low input impedance and low output impedance of the order of 30 ohms and including an output transformer and a selector switch adapted to be connected to said transformer; two pairs of twisted pair wires interconnecting the selector switches of the various stations, one pair constituting a party line and the other, a page line, to enable the user to selectively page or converse publicly over said loudspeakers or converse privately from handset to handset between stations.

2. A communication system as recited in claim 1 together with a hook switch in each station to disconnect said output transformer from said selector switch when the handset is hung up and the preamplifier is not in use.

3. A communication system as recited in claim 2 wherein each preamplifier has multiple stages having only transistors for amplication of low voltage, said stages being direct coupled, so as to provide less heat, consume less power and provide higher efficiency.

4. A communication system as recited in claim 2 wherein the amplifier for each loudspeaker has a multiple stage including an output stage, a high input impedance of the order of 10,000 ohms, a class A common emitter driver to provide an amplified signal for the output stage, a power output stage comprising a class B push-pull audio amplifier for energizing the loudspeaker, and temperature compensating means providing for proper operation of said last mentioned amplifier in ambient temperature range of between −40° to +75° C.

5. A communication system as recited in claim 3 together with a cabinet for enclosing each loudspeaker power amplifier and power supply therefor in the form of a plug-in unit to permit easy and quick replacement of the entire loudspeaker power amplifier and power supply.

6. A communication system as recited in claim 4 wherein the output stage of each loudspeaker amplifier includes transistors, and wherein said temperature compensating means includes means for transmitting heat from the transistor junction of said amplifier directly to the chassis of said enclosing cabinet which forms a heat sink providing maximum heat transfer and maximum output from the transistors, without sacrificing gain.

7. A communication system as recited in claim 5 wherein each of said receivers is substantially devoid of side tone and microphone signals so as to encourage loud speaking.

8. A communication system as recited in claim 5 wherein said temperature compensating means includes a compensating thermistor in the base circuit and a diode in the emitter circuit of the class B output stage to provide a bias step.

9. A communication system as recited in claim 5 wherein each preamplifier is temperature and gain compensated by a feedback loop and diode combination in the direct coupled section of the preamplifier and by constant current supply in the output stage of the preamplifier, to provide constant system gain and frequency response over a wide temperature and to allow use of transistors with wide parameter variations, thus allowing a high degree of interchangeability of the transistors range.

10. A communication system as recited in claim 5 wherein each preamplifier includes a center tapped power supply, a negative collector supply and a positive compensating bias in direct coupled stages and a positive voltage source for the constant curent supply for the output stage of the amplifier.

11. A communication system as recited in claim 5 wherein each loud speaker amplifier has a driver stage including a split primary winding in circuit relationship so that the high gain of a common emitter circuit is obtained with the heat dissipation advantages of grounded collector.

12. A communication system as recited in claim 5 wherein the output of said preamplifier includes a hybrid network for improving the intelligibility of the incoming signals to the handset earpiece by eliminating local noise and signal produced in the microphone of the handset and eliminating side tone, therefore improving intelligibility of the output signal by encouraging the person speaking into the microphone to speak louder because he does not hear his own voice in his earpiece.

13. A communication system as recited in claim 5 together with switching means operated by said hook switch for disconnecting the loud speaker amplifier of only the paging party, while paging.

14. A communication system as recited in claim 13 wherein said switching means also reconnects the paging party's speaker amplifier when he switches to the party line so that he may be paged even during a party line conversation.

15. A communication system as recited in claim 13 wherein the amplifier for each loud speaker consists of a transistor amplifier operated in class A, including a transistor having a collector junction firmly fastened to a heat sink, an output transformer with two separate and identical windings, an input transformer having an ungrounded secondary, said amplifier being in grounded emitter configuration for signals and grounded collector mechanically, whereby maximum gain of the common emitter are obtained with maximum heat transfer capabilities of the grounded collector.

16. A plant, voice communication system comprising a plurality of separate stations interconnected by two unshielded pairs of twisted pair wire; each station including a loud speaker and associated power amplifier and power supply therefor adapted to be plugged into an A.C. source of potential, and including a handset comprising a receiver and a microphone, a microphone preamplifier connected to said microphone, an output amplifier therefor of low output impedance of the order of 30 ohms, a hook switch connected to said output amplifier, and a selector switch connected to said hook switch and to the terminals of said two pairs of twisted pair wire; one of said pairs of wire being adapted to interconnect said loud speakers and associated power amplifiers of various stations to the microphone of the calling party through his selector switch so as to serve as a page line and, when the selector switches of the parties are in the party-line position, will allow voice communication between two or more stations through the other of said pairs of wire, said selector switch enabling switching of a public conversation over the page line to a private conversation between handsets and preamplifiers only, over the other of said pairs of wire for party line use without loudspeaker amplification, said selector switch including means for maintaining said page line active during a private conversation over the party line whereby the party talking over the party line may be paged even during private conversation, and whereby public and private conversations may be conducted simultaneously over said respective page and party lines, without interference therebetween.

17. A communication system as recited in claim 16 wherein said microphone is of the pressure differential dynamic type having low impedance in the order of 10 ohms which discriminates against noise a few feet away and allows the use of unshielded wire in the handset cord.

18. A communication system as recited in claim 16 together with an output transformer interconnecting said preamplifier output amplifier and hook switch in a manner so that when the handset is hung up, the output of the preamplifier is disconnected from the selector switch by the hook switch and the receiver is shorted to prevent acoustical coupling with the transmitter and a load is placed across a portion of the secondary of the output transformer, and means provided on the hook switch to silence an adjacent loudspeaker when the handset is removed from the hook switch with the selector switch in the page position to prevent acoustical feedback between the loud speaker and microphone, and whereby when the handset is removed from the hook switch, the output of the preamplifier is connected to the selector switch and said short in the receiver is removed.

19. A communication system as recited in claim 18 wherein said preamplifier comprises a multi-stage, direct coupled transistor preamplifier which is temperature compensated and gain compensated so as to be substantially unaffected by temperature variations between minus 30° to plus 70° centigrade.

References Cited in the file of this patent

UNITED STATES PATENTS

| | | |
|---|---|---|
| 2,575,844 | Shaw | Nov. 20, 1951 |
| 2,720,556 | Clark | Oct. 11, 1955 |
| 2,764,632 | Adler | Sept. 25, 1956 |
| 2,784,262 | Crow | Mar. 5, 1957 |
| 2,885,478 | Cerofolini | May 5, 1959 |
| 2,885,483 | Faulkner | May 5, 1959 |
| 2,889,416 | Shea | June 2, 1959 |
| 2,912,502 | Talcott | Nov. 10, 1959 |